(12) United States Patent
Miller et al.

(10) Patent No.: US 10,002,539 B2
(45) Date of Patent: Jun. 19, 2018

(54) METHOD AND APPARATUS FOR INTEGRATED RECORDING AND PLAYBACK OF VIDEO AUDIO AND DATA INPUTS

(75) Inventors: Charles G. Miller, Allison Park, PA (US); Clifford Olmstead, Lawrenceville, PA (US)

(73) Assignee: KbPort LLC, Pittsburgh, PA (US)

( * ) Notice: Subject to any disclaimer, the term of this patent is extended or adjusted under 35 U.S.C. 154(b) by 2920 days.

(21) Appl. No.: 11/945,611

(22) Filed: Nov. 27, 2007

(65) Prior Publication Data

US 2008/0124694 A1    May 29, 2008

Related U.S. Application Data

(60) Provisional application No. 60/867,199, filed on Nov. 27, 2006.

(51) Int. Cl.
*G09B 23/28* (2006.01)
*G09B 5/00* (2006.01)

(52) U.S. Cl.
CPC ............... *G09B 5/00* (2013.01); *G09B 23/28* (2013.01)

(58) Field of Classification Search
CPC .................................. G09B 5/00; G09B 23/28
USPC .................................. 434/262, 267; 600/323
See application file for complete search history.

(56) References Cited

U.S. PATENT DOCUMENTS

| | | | |
|---|---|---|---|
| 3,520,071 A | 7/1970 | Abrahamson et al. | |
| 5,403,192 A | 4/1995 | Kleinwaks et al. | |
| 5,701,153 A * | 12/1997 | Reichek et al. | ............. 348/14.1 |
| 5,853,292 A | 12/1998 | Eggert et al. | |
| 5,900,923 A | 5/1999 | Prendergast et al. | |
| 5,941,710 A | 8/1999 | Lampotang et al. | |
| 6,024,539 A | 2/2000 | Blomquist | |
| 6,535,714 B2 | 3/2003 | Melker et al. | |
| 6,938,029 B1 | 8/2005 | Tien | |
| 7,113,201 B1 * | 9/2006 | Taylor et al. | ............. 348/14.08 |
| 7,428,000 B2 * | 9/2008 | Cutler et al. | ............. 348/14.11 |

(Continued)

OTHER PUBLICATIONS

RGB Spectrum, Press Release, http://www.rgb.com/en/News/PrintNews.asp?page=News%2FProductAnnouncements%2FDGx2, Mar. 19, 2003.

(Continued)

*Primary Examiner* — Robert J. Utama
(74) *Attorney, Agent, or Firm* — Buchanan Ingersoll & Rooney PC

(57) ABSTRACT

A method for the integrated recording and playback of video, audio and data inputs using training simulators comprises the step of simultaneously receiving at least one data source input, audio input and video input into a common digital memory buffer in a time stamped manner for at least a given training event, wherein at least one of the data source inputs is a data record throughout the event of at least one simulated parameter of the training simulator, wherein at least one audio input is an audio record of the training event and at least one video input is a video record of the training event, and wherein the common memory buffer allows independent, simultaneous, synchronized, user controlled playback of the individual inputs received within the memory buffer. The system provides for contemporaneously flagging the common memory buffer during the event through a wireless controller.

16 Claims, 10 Drawing Sheets

(56) References Cited

U.S. PATENT DOCUMENTS

2004/0138864 A1*  7/2004  Kurzweil et al. ............... 703/11
2004/0161731 A1*  8/2004  Arington et al. ............. 434/262
2004/0204635 A1* 10/2004  Scharf et al. ................. 600/323
2005/0057496 A1*  3/2005  Uchikubo ..................... 345/156
2006/0085227 A1   4/2006  Rosenfeld et al.
2006/0179403 A1*  8/2006  Kirkpatrick ................ 715/501.1

OTHER PUBLICATIONS

John W. Lutz, Thomas Dongilli, John J. Schaefer III, http://www.wiser.pitt.edu/sites/wiser/news/2004/03/media/IMMS_Lutz_poster.pdf, The Integration of Performance Logs with Digital Video for Review of Simulation Training Sessions, University of Pittsburgh Medical Center (UPMC), Peter M. Winter Institute for Simulation Education and Research (WISER).

AP Labs Inc., http://www.aplabs.com/digital_video.html, Digital Video Systems, APLabs.com 2007.

* cited by examiner

METHOD AND APPARATUS FOR INTEGRATED RECORDING AND PLAYBACK OF VIDEO AUDIO AND DATA INPUTS

RELATED APPLICATIONS

The present application claims the benefit of provisional patent application Ser. No. 60/867,199 entitled "Method and apparatus for the integrated recording and playback of video, audio and data inputs using training simulators" filed Nov. 27, 2006.

FIELD OF THE INVENTION

The present invention relates to a method and apparatus for the integrated recording and playback of video, audio and data inputs using training simulators, particularly patient simulators in the medical environment.

BACKGROUND OF THE INVENTION

Medical devices are an integral and indispensable component of patient care. However, they present a number of unique problems that have not been adequately addressed by device manufacturers or the medical community in general. There is ample evidence that errors in the understanding and use of medical devices are responsible for considerable morbidity and mortality. Government agencies have begun to look more closely at the ability of medical institutions as well as manufacturers to accurately assess the dangers presented by medical devices. Further, the FDA has mandated the use of "human factors" experts in the design of medical devices to reduce the complexity of the device/human interface.

Learning to use various medical devices is often taught through textbooks, manuals, lectures, and videotapes. Obviously, while providing a low cost source for learning theory, these informational resources clearly lack the important benefit that can only be acquired from "hands-on" training and practice with the actual device. A number of manufacturers in other industries have designed interactive training systems (software based) to help users learn their specific systems, especially in the flight industry (e.g., Microsoft Flight Simulator™). For example, a manufacturer may include a video, computer program, or interactive web site to illustrate and present step by step instructions on the proper use. A software program with a simulated image of the device controls may also allow a user to practice using a specific device (e.g., U.S. Pat. No. 6,024,539 which discloses a computer image of an infusion pump with various programs for simulating operation of the manufacturer's pump). Each of these training systems are designed solely for the specific instrument being taught.

In order to teach the use of multiple instruments, especially in the medical arena, there are presently available patient simulator mannequins to provide "hands-on" training to medical personnel in areas such as trauma treatment and anesthesiology. These mannequins typically have significant capabilities including spontaneous breathing, pulse, heart and breath sounds and the ability to monitor vital signs such as ECG, pulse oximetry and end-tidal carbon dioxide by connecting commercial off-the-shelf (COTS) medical devices to the simulator. Various medical devices can be attached to these mannequins to train users in the proper implementation and use (e.g., endotracheal tube, EKG monitor, blood pressure cuff, pulse oximeter, automatic external defibrillator). These mannequins are typically computer controlled and are programmed for a variety of responses which simulate medical conditions. Examples of such mannequins are disclosed in U.S. Pat. No. 5,941,710, U.S. Pat. No. 5,900,923, U.S. Pat. No. 5,403,192, and in U.S. Pat. No. 3,520,071, the disclosures of which are incorporated herein by reference.

Using patient simulator mannequins, the students, nurses, medical personnel, etc. can develop skills in manual dexterity and proper placement of leads, tubes, etc. without risk. One unique approach to the use of patient mannequins was taken in U.S. Pat. No. 5,853,292 which discloses using sensor-equipped "virtual" instruments interfaced with a patient simulator through a computer interface module (CIM). The CIM confirms correct placement of the various instruments onto the patient. The system is used in conjunction with a training program on a computer. For example, a user can select the CPR training session. The screen displays include sequential actions which integrate the basic concepts of CPR. The session may be recorded and the results displayed. This system, however, carries over the same disadvantage of the above-noted patient simulators in that it still requires a large capital outlay for the equipment and uses only virtual (rather than real) medical devices. U.S. Pat. No. 6,535,714 relates to medical device training, and, more particularly, to a method, system, and apparatus for training users in the understanding and use of numerous medical devices, including providing for documentation of competency during the training exercise Further, SimMan™ is a portable and advanced patient simulator for team training from Laerdal Medical. The SimMan™ patient simulator has realistic anatomy and clinical functionality and provides simulation-based education intended to challenge and test students' clinical and decision-making skills during realistic patient care scenarios. The SimMan™ patient simulator provides an interactive manikin allowing learners to practice the emergency treatment of patients Patient simulators comprise several core elements. The most visible is the patient mannequin, which resembles the mannequins used for cardiopulmonary resuscitation training, although much more advanced. For instance, patient mannequins used for simulation purposes produce breathing sounds as the electro-mechanical lungs inhale and exhale according to computer-based instructions. They have anatomically correct airways as well as a palpable pulse and heart rhythm that can be monitored on an electrocardiograph. Some mannequins have arms and legs that are capable of moving and swelling, and computer-controlled eyes that respond appropriately to various stimuli. Some even have gas analyzers that recognize the makeup of inhaled medications and cause the mannequin to respond accordingly.

The Eagle Patient Simulator, developed by David Gaba, Md., and others, at Stanford University, and marketed by MedSim (Ft. Lauderdale, Fla.), connects to an interface cart that drives the mannequin's electromechanical functions. The cart also serves as the interface for conventional monitoring equipment found in the operating room. For example, it provides a flow of physiological data to off-the-shelf pulse oximeters and invasive blood pressure monitors, further heightening the realism of the simulation. This Stanford simulator has a "split brain," which consists of two computers that operate simultaneously to control all aspects of the simulation. One computer runs programs designed to simulate the human body, including its cardiovascular, pulmonary, metabolic, fluid and electrolyte balance, and thermal-regulation characteristics. The computer program's sophistication makes it capable of accurately modeling the body's reaction to myriad physiological inputs, such as intravenous drug administration.

The G. S. Beckwith Gilbert and Katharine S. Gilbert Medical Education Program in Medical Simulation is a resource for all Harvard Medical School students and faculty. The Gilbert Program bridges basic and clinical science in an integrated learning lab. Each lab is equipped with a realistic mannequin patient simulator, a seminar table with whiteboard, and a web-connected plasma display. This unified learning lab brings together traditional teaching and web-based information technology all at the bedside of a simulated patient. The mission of the G. S. Beckwith Gilbert and Katharine S. Gilbert Medical Education Program is to "bring to life" good teaching cases for medical students of all levels using high-fidelity patient simulation to foster experiential learning in a safe environment"

The realism of the patient simulators represents only half of the battle regarding the entire educational experience. It is common for the simulation events to be monitored and even recorded, typically on videotape, for peer or teacher review. This critical review and feedback of a session is as important a teaching tool as the simulation itself. In such analysis and feedback, the trainees can have mistakes pointed out and corrected. Conventionally this entails that the entire event is recorded on a camera for playback. The recording of the event is particularly useful in simulations where there are multiple participants, i.e. a "team" of participants, that may have overlapping spheres of influence, and the event recording is the only effective review of the team interaction to review how the team worked together. The simulator itself will often have a recording of the changes in all of the particular simulated physiologic parameters of the simulator (i.e. the data output) over the time of the session for latter analysis, whereby there is an objective review of the session on the simulator (i.e. how did the simulated patient do throughout the event). The data output record of a session does not provide adequate information as to why a particular patient result was achieved in a session, particularly in a team participant environment with overlapping areas of influence relative to the simulated physiologic parameters of the simulator. A video and an audio recording of the event does add the ability to review why a particular result was or was not achieved in a session with the patient simulator. However, there is currently no system for effectively synchronizing these recordings for analysis and for playback (feedback).

In 2003, the Peter M. Winter Institute for Simulation, Education and Research (WISER), which is a large simulation center located at the University of Pittsburgh Medical Center (UPMC), attempted to utilize the Laerdal SimMan™ Simulator to generate Extensible Markup Language (XML) performance logs of simulation sessions that could then be utilized to correlate with a digital primary video file. These log files included events and comments. The digital video recording was stored on a central server with playback made available over the Internet via a standard web browser. Playback was indexed to specific time points during the recording based upon the log files. The time stamp on the performance log was attempted to be utilized as an index mechanism for the primary video file. The system never proved to be effective in practice, however, even the proposed integration was not sufficient to be a meaningful tool for students. The proposed system did not offer independent control over various inputs.

Thus, there is a need in the art to develop method and apparatus for the integrated recording and playback of video, audio and data inputs using training simulators, particularly for patient simulators.

SUMMARY OF THE INVENTION

In accordance with the present invention, a method and apparatus for the integrated recording and playback of video, audio and data inputs using training simulators, such as patient simulators comprising the step of simultaneously receiving at least one data source input, at least one audio input and at least one video inputs into a common digital memory buffer in a time stamped manner for at least a given training event. At least one of the data source inputs is a data record throughout the event of at least one simulated parameter of the training simulator. Each audio input is an audio record of the training event and each video input is a video record of the training event. The common memory buffer allows independent, simultaneous, synchronized, user controlled playback of the individual inputs received within the memory buffer.

The present invention is disclosed for patient simulators, but is not limited thereto. The present invention has applications in all training simulations where integrated simulation data and relevant recording would be helpful, such as flight simulators. However, it is particularly useful in "team training" simulators such as patient simulators where team interaction is critical.

The present invention is also disclosed for use for integrating digital video and audio recordings with data inputs in the form of time stamped moderator commentary or notes, and is particularly helpful in scenarios where contemporaneous moderator commentary can be added in a manner transparent to the subjects, whereby the subjects remain virtually unaffected by the moderator actions. The adding of time stamped moderator commentary or notes to the recorded integrated record is also known as "flagging" within the meaning of this application. The flagging of the record can also be done subsequent to the session where the moderator, or other reviewer, can expand upon contemporaneously added flags, add new flags, edit other flags, as desired.

The phrase data source inputs when associated with a training simulator, such as a patient simulator, reference data outputs of the training simulator that is indicative of each simulated parameter throughout the duration of an event. In a patient simulator the data source outputs will be indicative of each simulated physiologic parameter that is represented by the specific patient simulator (e.g. heat rate, breath rate, blood pressure, blood oxygenation, body temperature, pupil dilation, extremity changes, etc). In a flight simulator, for example, the data source points will be indicative of each simulated airframe parameter that is represented by the flight simulator. The data source inputs can also be flags that are not associated with a training simulator.

The term event is intended reference a given training session, which may be on a training simulator, by a given set of participants (or team). The term event can be used interchangeably herein with session or with training event. The participants, could in certain circumstances, be only a single individual without changing the operation of the present invention. Further the "team" may include one or more instructors or moderators that are working with one or more trainees, or the participants may be entirely of instructors to create a given session baseline for comparison.

The phrase "audio record of the training event" relative to at least one audio input will reference an audio recording of the event including the participants (and/or monitors) in or with the training environment. The audio record of the training event will typically pick up the sounds of the participants (assuming they speak loudly and clearly enough—which is certainly another review criterion in team training) and of the simulator, if any. The present invention contemplates more than one audio record of the training event. Further, other audio inputs other than the participants are possible, such as a real time audio commentary of possibly remote observers; however such a real time commentary would still be an audio record of the training event, with the event location including both the location of the participants and the simulator and the location of the monitors.

The present invention allows reviewer commentary or flags to be added to the combined memory, or log file, in a time sequenced manner contemporaneously with the event and after the event has been recorded. The flags may be edited later and are not limited to text, the flags could be in audio segments or even audio video segments (e.g. a moderator inserts a time appropriate video commentary including a demonstration of a proper technique to better illustrate his comment). Consequently, the present invention allows subsequent moderators or reviewers (i.e. those NOT present at the training session) to add commentary or flags, generally via text inputs, into the integrated log file to create appropriately located comments therein for review. These latter comments could be in audio or even video formats if desired for incorporation into subsequent playback of a moderated or graded session. Note that such latter added audio commentary for the flags is not an "audio record of the training event" as it is not contemporaneous therewith. The video commentary added later is similarly not a video record of the training event. The flags, whether they include text, audio video or combinations thereof are considered data inputs within the meaning of this application.

Finally, the simulator may have audio files as outputs, such as a record of the breathing sounds emitted by the simulated throughout a session; however, these audio files are considered data inputs within this disclosure as they are indicative of each simulated physiologic parameter that is represented by the specific patient simulator.

The phrase "video record of the training event" relative to at least one video input will reference a video recording of the event including the participants (and/or monitors) in or with the training environment. The video record of the training event will typically show one view of the participants and/or simulator. The present invention contemplates more than one video record of the training event, whereby the video record can have distinct views that focus on different aspects. For example on view may be an overhead view focusing on the simulator, a second view be a perspective view focusing on one side of the participants and a third view that is a perspective focusing on the participants from an opposed side.

The common log file creates an integrated log file of time stamped data from all of the video, audio and data inputs. From this integrated log file the users can simultaneously play back any, and all, of the inputs in a synchronized fashion. Each video input may be played back in its own, independently sizable and locatable window on a display, such as a laptop display. The data inputs from a simulator will also have a conventional visual playback format, and it is common for multiple data inputs to be illustrated together. For example, heart rate, blood pressure, breath rate, and blood oxygenation are typically shown numerically and graphically in one panel display. The audio inputs can be played back independently depending upon the set up of the playback display (e.g. left and right and or front and back side audio may be different). Alternatively, all the selected audio inputs may be appropriately mixed in the simultaneous feedback. The log file will also provide a display of the flags added to the file during playback, which may be integrated with other data inputs from the simulator.

The independent selection of the inputs for feedback allows the playback to remove extraneous inputs during playback of a certain portion of the session. For example, the audio inputs can be turned off and the playback only utilize an audio data file of the patient simulator with only a video centered on the patient simulator during a portion of the session where it was critical that the team participants recognize and change their actions based upon such simulator outputs.

The feedback controls will include standard digital playback options, such as play, stop, fast forward, time indexing, reverse and the like. Consequently in a detailed review and analysis of an event it is expected that moderators will play back a selected portion concentrating on one aspect, such as the patient simulator outputs, and then review the same portion of the session concentrating on the a separate aspect such as the participant actions. This sequential review of the same time period will entail a play back of the common log file with one set of inputs selected for play back and then a review of the same time period with an alternative set of inputs selected. Alternatively, for the video portions, the "concentration" on a particular section may be made by merely resizing of the desired windows to add emphasis as desired.

The integrated common log file provides for exporting a recorded session to any standard format, such as AVI or the like, for ease of transfer to other playback devices. The playback of an AVI or other "formatted" exported log file will no longer contain the ability to selectively elect the inputs for playback, as it will play back with the screen selections selected when transferred. However, this allows for easy transfer of a recorded, flagged training session to non-system computers.

Another optional feature of the present invention is that it is contemplated that the authorized users will swipe a user identification card (e.g. a student ID or an employee ID card) past an associated reader and this information can be automatically incorporated into the integrated log file. This can greatly facilitate use of the device in university environments. This automated input is believed to be useful for all of the participants. Alternatively this information can be added to the integrated log file manually as latter, moderator added text.

The present invention may be set up in a wireless network configuration in which audio and video sources that come into range of the central controller, or server, are automatically integrated into the combined log file at that point. The wireless network configuration for the present system provides for easy system portability and easy system set up and modification. Further the present invention provides for a subject transparent interview or session flagging feature through a hand held wireless remote control for a moderator. This allows for training to be largely unaffected by the addition of moderator flags.

The present invention provides an interactive, integrated log file of an event using a simulator and or other data input device. The integrated log file provides effective backup log file for the event. The integrated log file allows for significant screen control in the selective playback of the session. The integrated log file allows for downloading of the session in standard formatting for playback on other devices. The system allows for automatic user identification and incorporation of participant identification into the integrated log file.

These and other advantages will be clarified in the following description of the invention in association with the attached figures in which like reference numerals represent like elements throughout.

DETAILED DESCRIPTION OF THE INVENTION

Figure 1:
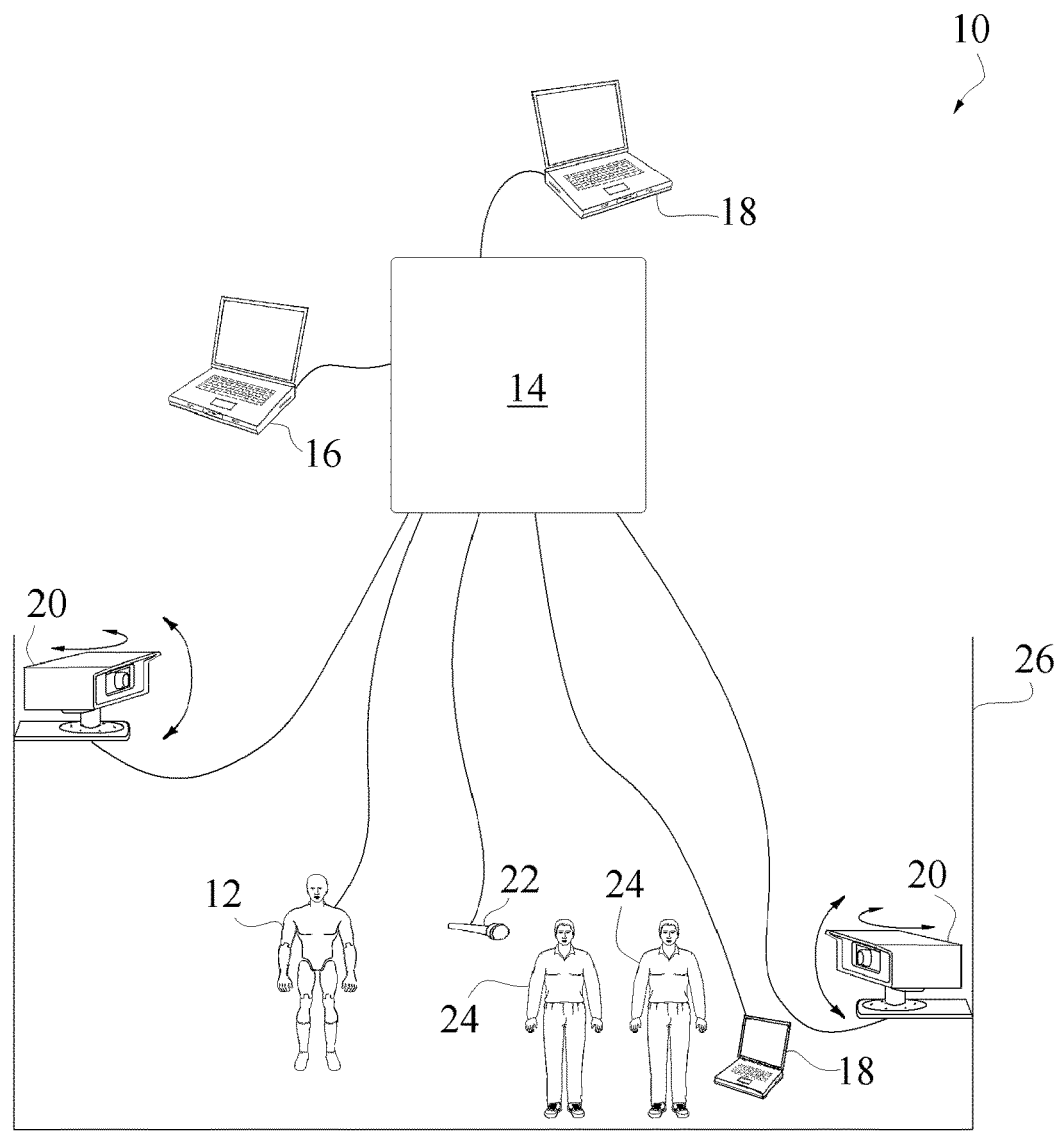
FIG. 1 is a schematic overview of the apparatus for the integrated recording and playback of video, audio and data inputs using patient simulators in accordance with one aspect of the present invention.

In accordance with the present invention, as shown in FIG. 1 a method and apparatus 10 for the integrated recording and playback of video, audio and data inputs using training simulators 12 is disclosed. The training simulators 12 may be patient simulators such as sold by Laerdal Medical (SimMan™ brand) or Medsim, discussed above. A controller 14 will receive data inputs from the simulator 12 that are indicative of the physiologic parameters being simulated thereon. The controller 14 may be provided with its own display as noted in FIGS. 3 and 4, whereby the controller 14 is formed by a separate independent computer, such as a desktop, laptop or even tablet computer.

Figure 3:
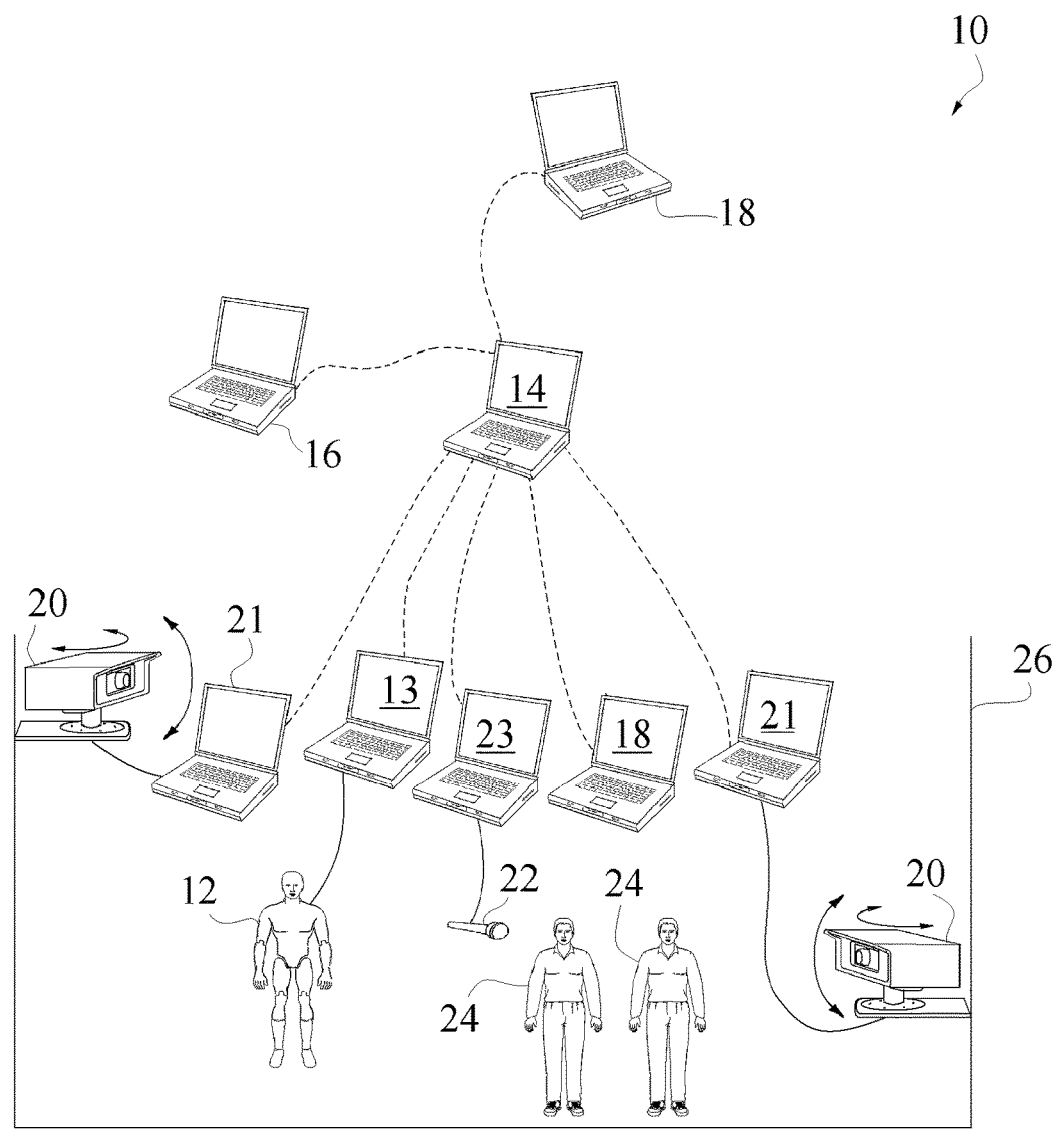
FIG. 3 is a schematic overview of the apparatus for the integrated recording and playback of video, audio and data inputs using patient simulators in accordance with another aspect of the present invention.
Figure 5:
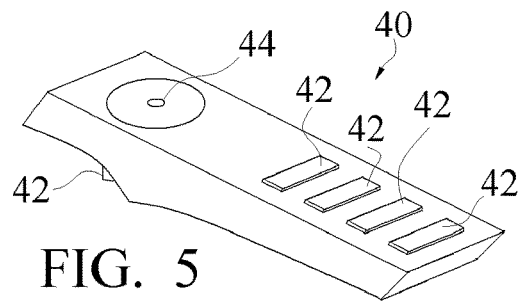
FIG. 5 is a schematic view of the wireless flagging unit of FIG. 4.

The data inputs received from the simulator 12 will typically be the same that simulators 12 currently maintain in the simulator session recordings, however, as discussed below these inputs will be integrated into a common log file. Namely these data inputs correspond to data outputs of the training simulator 12 that are indicative of each simulated physiologic parameter that is represented by the specific patient simulator (e.g. heat rate, breath rate, blood pressure, blood oxygenation, body temperature, pupil dilation, extremity changes, etc). The simulator 12 may have an external controller 13 with its own display for control of the simulator 12 and the controller 14 may be easily coupled to the controller 13 as shown in FIG. 3. The controller 13 may be a separate computer such as a desktop, laptop or tablet computer or the like.

The apparatus 10 of the present invention will allow the recorded event to be played back on a standard computer 16 with associated display, and will allow the event to be played back on other devices, such as other networked computers 18, coupled to the controller 14. The computers 16 and 18 can also be used to add contemporaneous comment or flags to the log file during the session, which would be recorded as part of the total event history. The flags may be edited later via the computers 16 or 18. Consequently, the present invention allows subsequent moderators or reviewers to add commentary or flags, via computers 16 or 18, into the integrated log file to create appropriately located comments therein for review. These latter comments could be in audio or even video formats if desired for incorporation into subsequent playback of a moderated or graded session.

Figure 4:
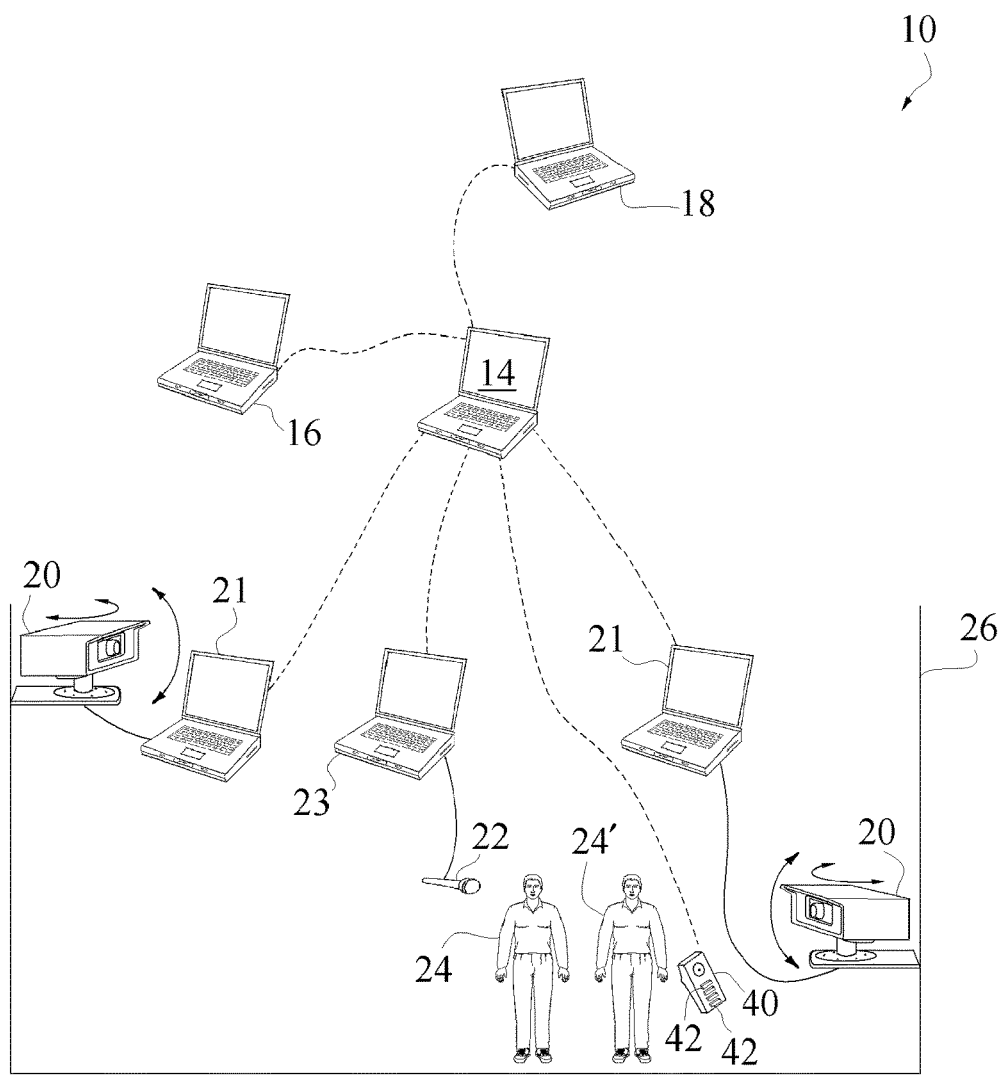
FIG. 4 is a schematic overview of the apparatus for the integrated recording and playback of video, audio and data inputs using wireless flagging unit in accordance with one aspect of the present invention.

A plurality of video cameras 20 will provide video feeds of the event from different view points. The cameras 20 may be fixed in position or preferably may be controlled to allow moderators to adjust the view as desired, typically through computers 16 and 18, with such control changes in camera view also being recorded in the log file. Each camera 20 is expected to carry a microphone for recording of a separate audio signal. The cameras 20 may be coupled directly to the controller 14 or through a separate video camera controller 21, as shown in FIGS. 3 and 4. The controller 21 may be a separate computer such as a portable laptop or tablet computer or the like. The video feeds may be through a frame grabber card on the controller 14 or 21, or more preferably and possibly more economically may be through a digital web cam device forming camera 20 coupled to the controllers 21 or 14 through a USB port connection. Other video sources may be used with analog to digital converters which then would generally be coupled to the controllers 21 or 14 through USB port connections. The cameras 20 and/or the controllers 21 will typically have a microphone such that these devices will also supply a separate audio input.

Independent microphones 22 may be employed as desired for obtaining separate audio signals that are not associated with a given camera view. The separate microphones may be coupled to the controller 14 or through a separate controller 23, which may be a separate computer such as a portable laptop or tablet computer or the like.

It is expected that the participants 24 in any session will be in a given location 26 having a plurality of mounted cameras 20 and microphones 22 relative to the intended position of the patient simulator 12. An optional feature of the present invention is that the participants 24, i.e. authorized users, will swipe a user identification card (e.g. a student ID or an employee ID card) past an associated reader (possibly integral to computer 18 within the location 26) and this information can be automatically incorporated into the integrated log file. This can greatly facilitate use of the device 10 in university environments. This automated input is believed to be useful for all of the participants. Alternatively this information can be added to the integrated log file manually through computer 18 contemporaneously with the session or latter, in moderator added text flags.

Figure 2:
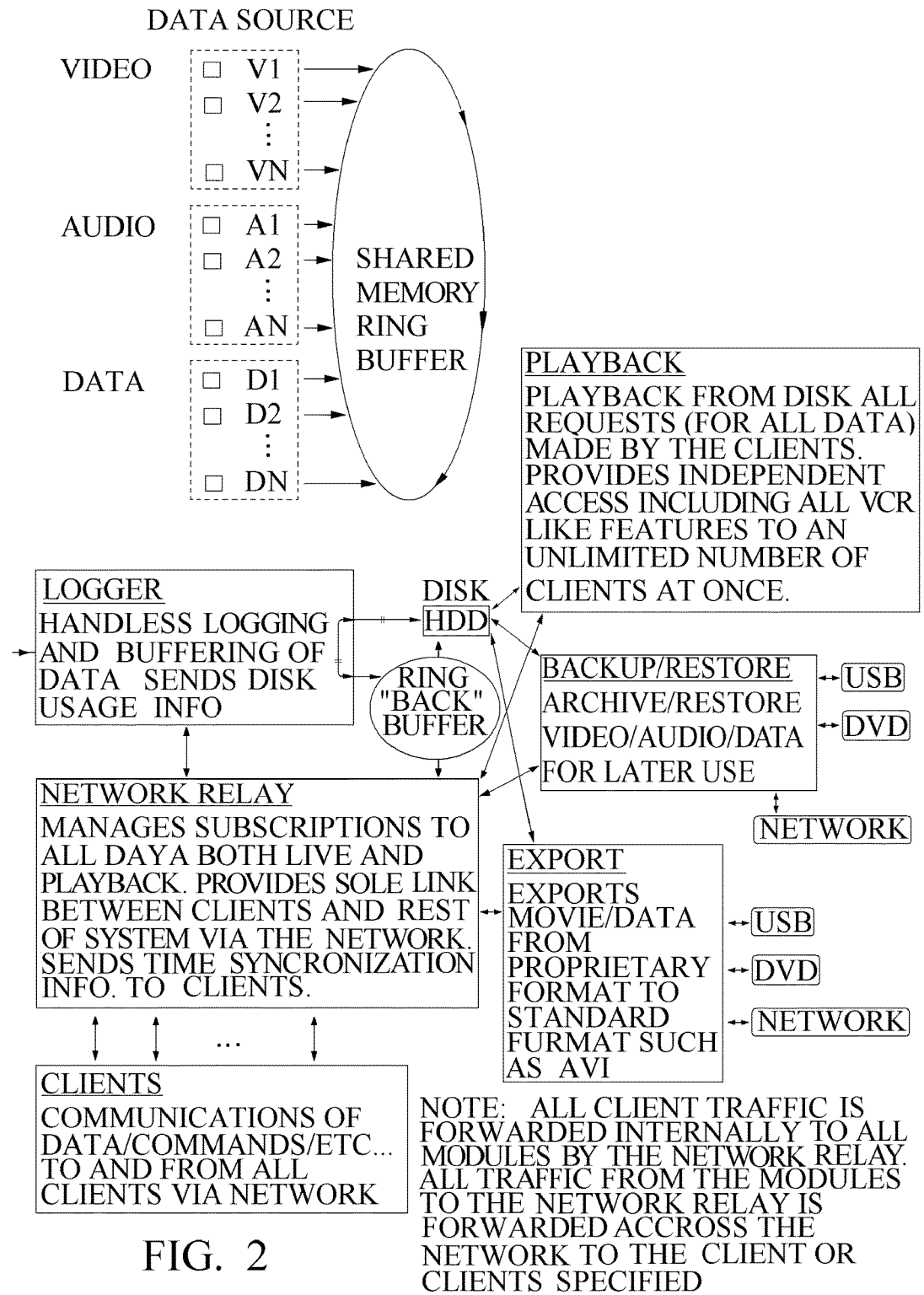
FIG. 2 is a schematic flow chart of the creation of an integrated log file of the apparatus for the integrated recording and playback of video, audio and data inputs using training simulators according to one aspect of the present invention.

FIG. 2 schematically illustrates the process of the present invention. The present invention simultaneously receives at least one, and preferably a plurality, data source input, at least one, and preferably a plurality, audio input and at least one, and preferably a plurality, video inputs into a shared memory ring buffer. Any number of video and audio inputs may be used in the present invention, and the present invention has found excellent operation with up to eight separate video and audio channels or inputs. Eight audio and video channels have been found to be well more than enough to cover all the different viewpoints that have been desired. The number of data inputs is determined by the simulator 12 and flags added. The simulator 12 inputs are collectively called data sources and each data source runs as an independent process. The ring buffer provides a buffer against disk reading slow downs due to movement of the disk drive.

The ring buffer sends the received data and will send the data in time order, i.e. time stamped, to a ring type back buffer. The ring back buffer will maintain a set time of integrated log file of all of the inputs. This back buffer will send the integrated log file of the data sources to a hard drive if instructed to "record". With this configuration, the system 10 is always "recording" due to the ring back buffer, but permanent records are maintained only in when the system receives instructions to record. The record command can therefore be "back dated" the length of the ring back buffer (typically around 5 minutes). In other words, if something happens in location 26 that the moderators would wish to capture in a recorded session there will be a short buffer time to allow the session to begin and hitting "record" will capture the last 5 minutes (or the length of the ring buffer).

With a recorded session, e.g. the time stamped integrated log file of all data source inputs) sent to the hard drive, the hard drive allows independent, simultaneous, synchronized, user controlled playback of the individual inputs received within the memory buffer on computers 16 or 18. The users can simultaneously play back any, and all, of the inputs in a synchronized fashion. Each video input may be played back in its own, independently sizable and locatable window on a display, such as a laptop display on computers 16 or 18 or even 14 (if provided with its own display). The data inputs will also have a conventional visual playback format, and it is common for multiple data inputs to be illustrated together. For example, heart rate, blood pressure, breath rate, and blood oxygenation are typically shown numerically and graphically in one panel display. The audio inputs can be played back independently depending upon the set up of the playback display (e.g. left and right and or front and back side audio may be different). Alternatively, all the selected audio inputs may be appropriately mixed in the simultaneous feedback.

As discussed above, the independent selection of the inputs for feedback allows the playback to remove extraneous inputs during playback of a certain portion of the session. For example, the audio inputs can be turned off and the playback only utilize an audio data file of the patient simulator with only a video centered on the patient simulator during a portion of the session where it was critical that the team participants recognize and change their actions based upon such simulator outputs. The feedback controls will include standard digital playback options, such as play, stop, fast forward, time indexing, reverse and the like. Consequently in a detailed review and analysis of an event it is expected that moderators will play back a selected portion concentrating on one aspect, such as the patient simulator outputs, and then review the same portion of the session concentrating on the a separate aspect such as the participant actions. This sequential review of the same time period will entail a play back of the common log file with one set of inputs selected for play back and then a review of the same time period with an alternative set of inputs selected. Alternatively, for the video portions, the "concentration" on a particular section may be made by merely resizing of the desired windows to add emphasis as desired.

The present invention allows the subsequent moderators or reviewers to add commentary flags, generally via text inputs, into the integrated log file stored on the hard drive to create appropriately located comments therein for review. These latter comments could be in audio or even video formats if desired for incorporation into subsequent playback of a moderated or graded session.

The integrated common log file provides for exporting a recorded session to any standard format, such as AVI or the like, for ease of transfer to other playback devices. The playback of an AVI or other "formatted" exported log file will no longer contain the ability to selectively elect the inputs for playback, as it will play back with the screen selections selected when transferred.

FIG. 3 is a schematic overview of the apparatus 10 for the integrated recording and playback of video, audio and data inputs using the patient simulator 12 in accordance with another aspect of the present invention. In this configuration of the invention the controller 14 is in the form of a computer with its own display. This has been found to be helpful in that the controller 14 display will easily illustrate the collection of video and audio inputs coupled to the system 10. This is helpful in that other displays will be utilized for other aspects such as camera display and control for the display for controller 21, simulator function for the display on controller 12, moderator comments for the display on computer 18 adjacent the participants 24. The other aspect of the present invention illustrated in FIG. 3 is the portability offered by a wireless configuration. The wireless coupling between the components of the system 10 and the controller 14 is illustrated in dashed lines in FIGS. 3 and 4. In the wireless configuration the system 10 is set up as a wireless network with the controller 14 acting as a server issuing IP addresses to networked computers such as 13, 16, 18, 21 and 23.

Another feature of the wireless network configuration is that it is designed to have video and audio feeds synch up automatically to the log file when they become in range of the controller 14 during a session. It will be appreciated that the controller 14 and/or the audio/video and data sources may be mobile. For example, the scenario may follow a simulated patient 12 from a remote scene on an ambulance into an emergency room then an operating room, with each stage of the process having its own set of feeds. With the wireless controller 14 formed as a laptop or other portable device it can easily move with the "patient" and pick up the various feeds as they come into range. Further, the cameras may be made mobile that can bring them into and out of range during a session. The auto-synch function allows for these variations to be accommodated without stopping the session and reconfiguring the system as each new source comes on line.

In certain training sessions the moderator 24 leads a trainee 24 through a simulated session, such as where the moderator acts as a potential customer, vendor, regulator for an employee/trainee 24. In such training scenarios adding flags to the log file through a conventional input device like a keyboard on computer 18 can interrupt and/or influence the session. For example the trainee will notice the entry of the flag by the moderator 24' and begin wondering what they did right, did wrong or otherwise did that prompted the entry of the flag, and this can detrimentally affect the progress of the session. FIG. 4 is a schematic overview of the apparatus 10 for the integrated recording and playback of video, audio and data inputs using wireless flagging unit 40 in accordance with one aspect of the present invention. In this configuration the system 10 there is no simulator 12. The present invention provides for a subject transparent interview or session flagging feature through a hand held wireless remote control or flagging unit 40 for a moderator 24'. This allows for training to be largely unaffected by the addition of moderator flags. The flagging unit 40 is a handheld device with a plurality of independent, programmable input buttons 42 that provide for flags to be entered into the log file. The flagging unit may be a hand held wireless remote such as the Jade brand presentation remote from Interlink Electronics that has four front face programmable buttons 42 and mouse functionality, which gives two more independent buttons 42. It can be helpful if the unit 40 includes separate functionality 44 such as a laser pointer or audio recorder. The separate functionality 44 allows the moderator 24' to mask the reason for holding the remote from the trainee 24, although small hand held units 40 are so inconspicuous that such masking is not necessary. With the separate functionality 44 it can be possible for a moderator 24' to visibly hold the flagging unit 40 and use it throughout the session without the trainee 24 knowing that the flagging is occurring. With separate programmable buttons the moderator can hit designated flags which can be preprogrammed to add any desired textual (or audio or video) flag, such as "Good"; "Bad"; "Illegal" or "What were you thinking." As described above the system 10 allows the moderator to edit flags after the session to expand upon any comment, but the preprogrammed classifications may ease the need for subsequent editing. The flags may, of course be color coded in the play back to further accentuate the training (e.g. red for bad flags and green for good flags). More than one moderator may have a unit 40 and each unit can be identified by the system 10 (e.g. two opposing attorneys flagging the same deposition testimony).

A review of the display 60 associated with the system 10 may be helpful for demonstrating the aspects of the present invention. The displays can be modified greatly depending upon the particular application of the system 10 and the needs of the users.

Figure 6:
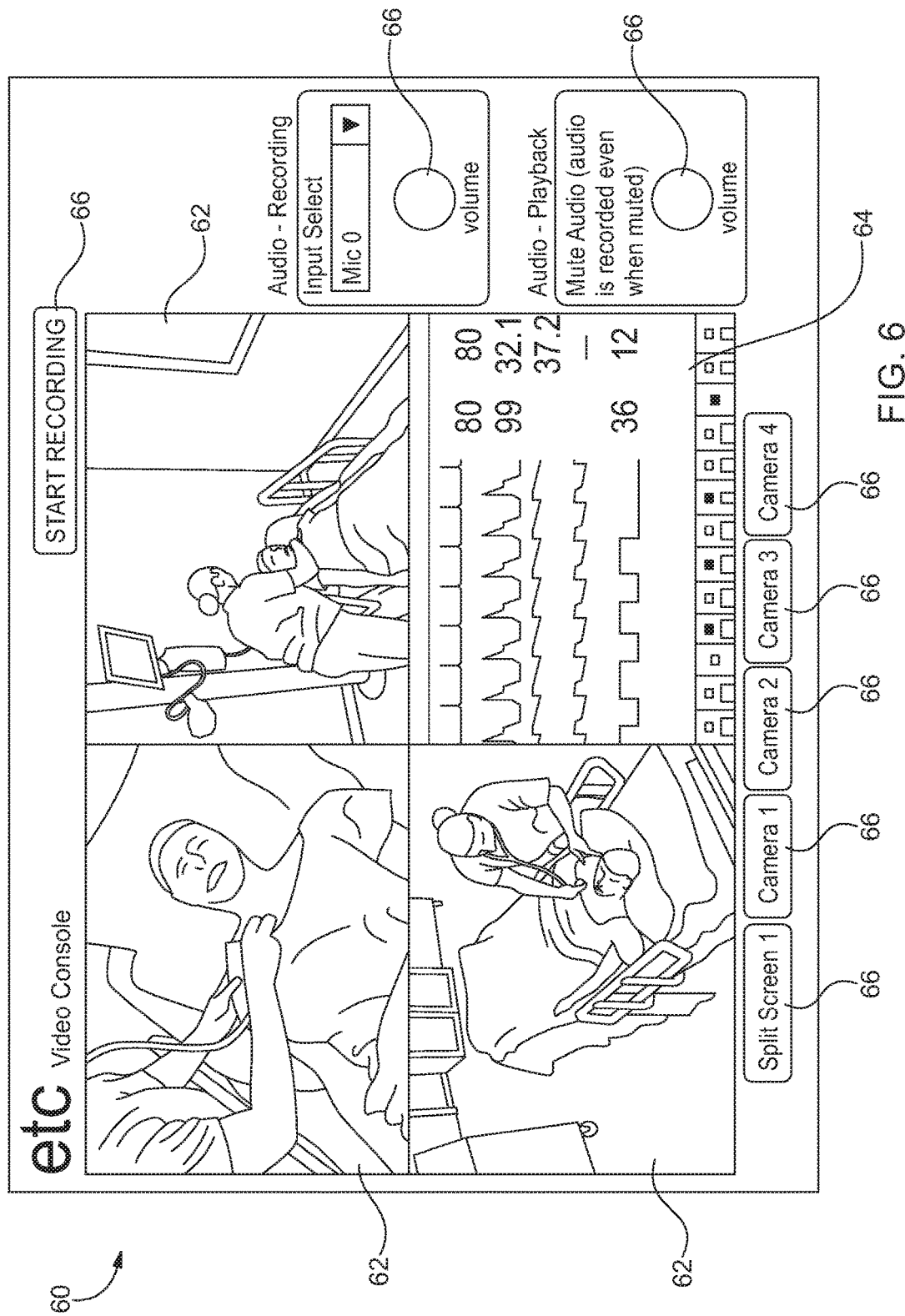
FIG. 6 is a representative screenshot illustrating one set of video and data displays with on screen controls for the apparatus for the integrated recording and playback of video, audio and data inputs using patient simulators according to the present invention.
Figure 7:
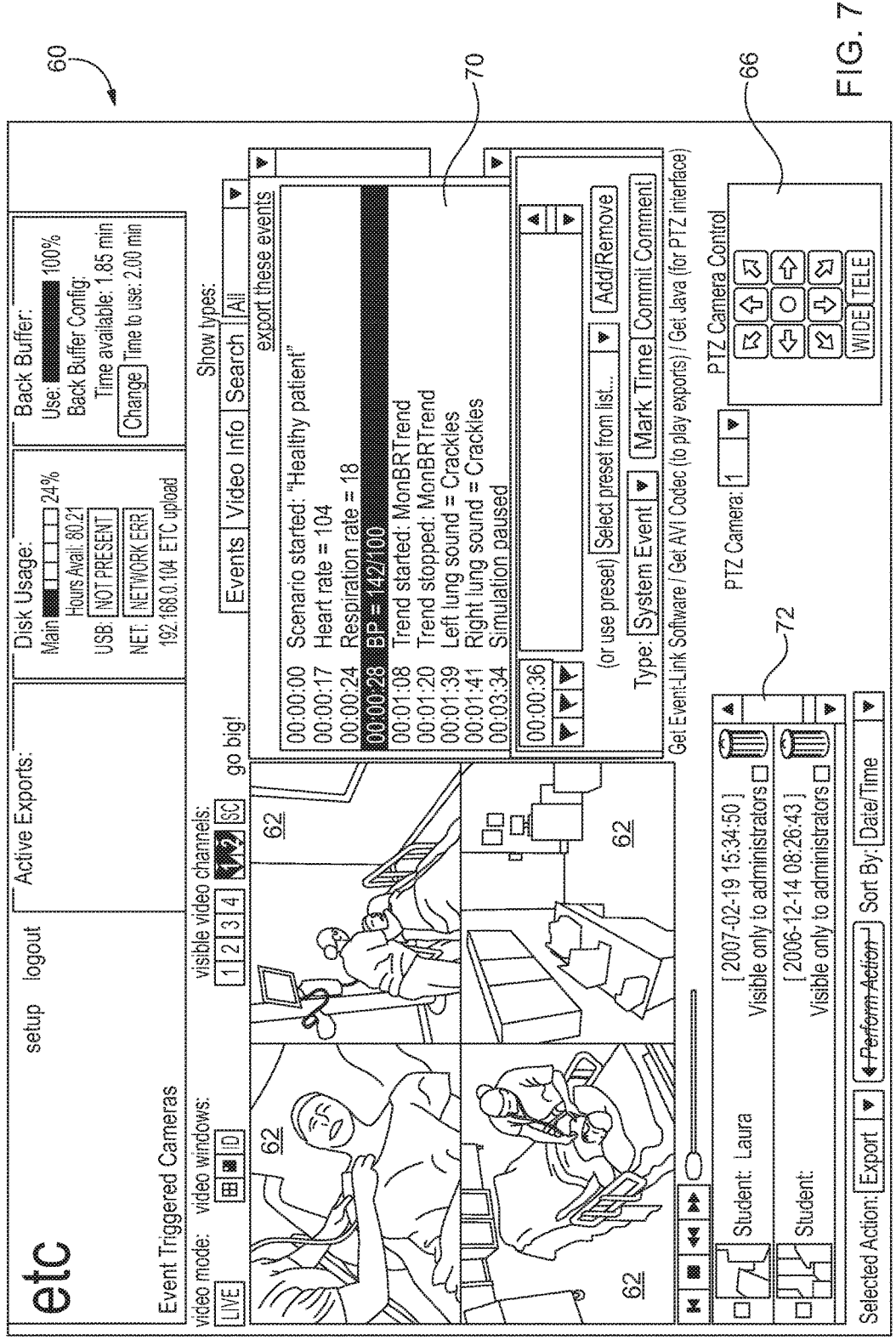
FIG. 7 is a representative screenshot illustrating one set of video and data displays with on screen controls, event log display and session library for the apparatus for the integrated recording and playback of video, audio and data inputs using patient simulators according to the present invention.
Figure 8:
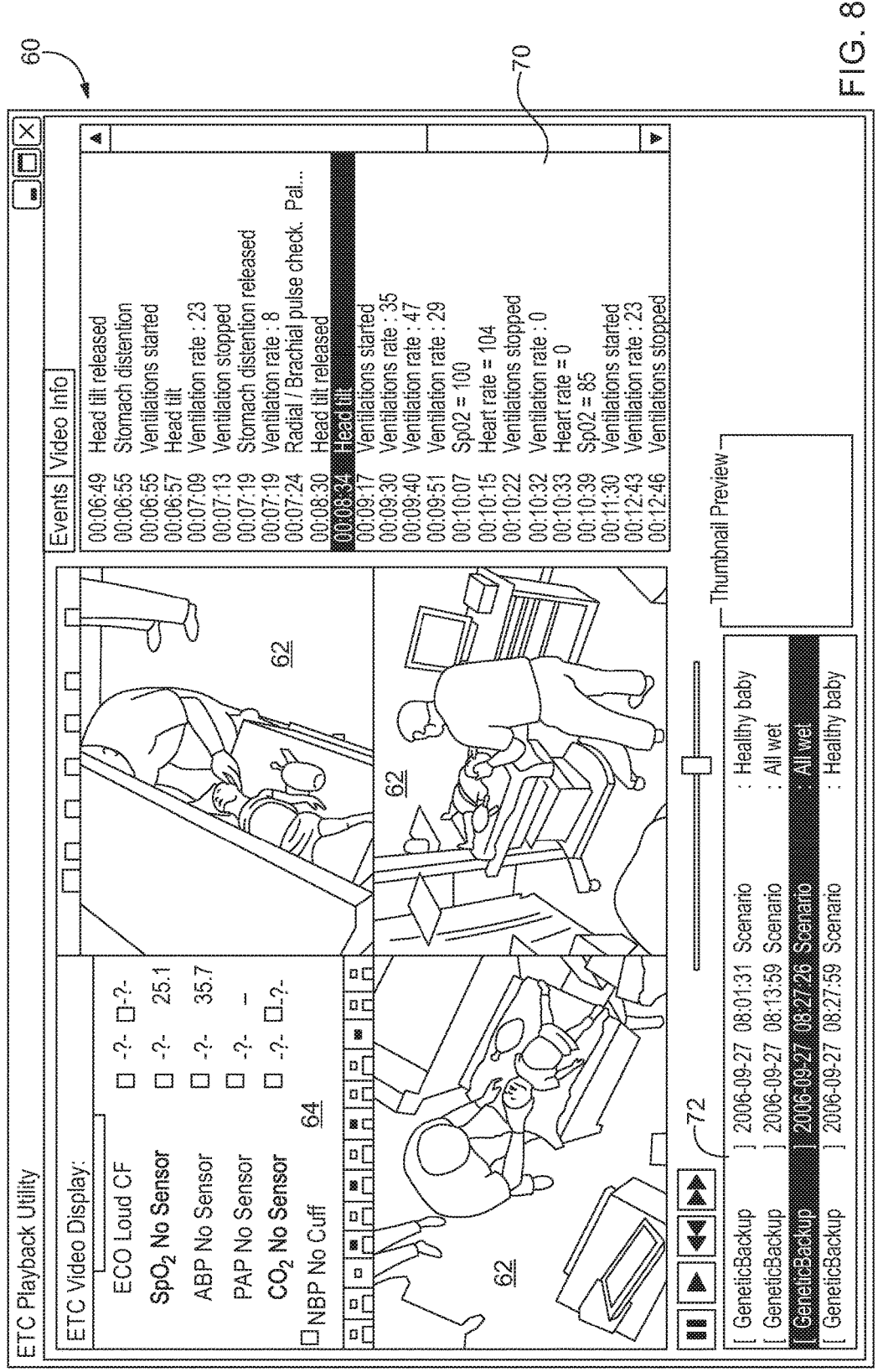
FIG. 8 is a representative screenshot illustrating one set of video and data displays with on screen controls, event log display and session library for the apparatus for the integrated recording and playback of video, audio and data inputs using patient simulators according to the present invention.
Figure 9:
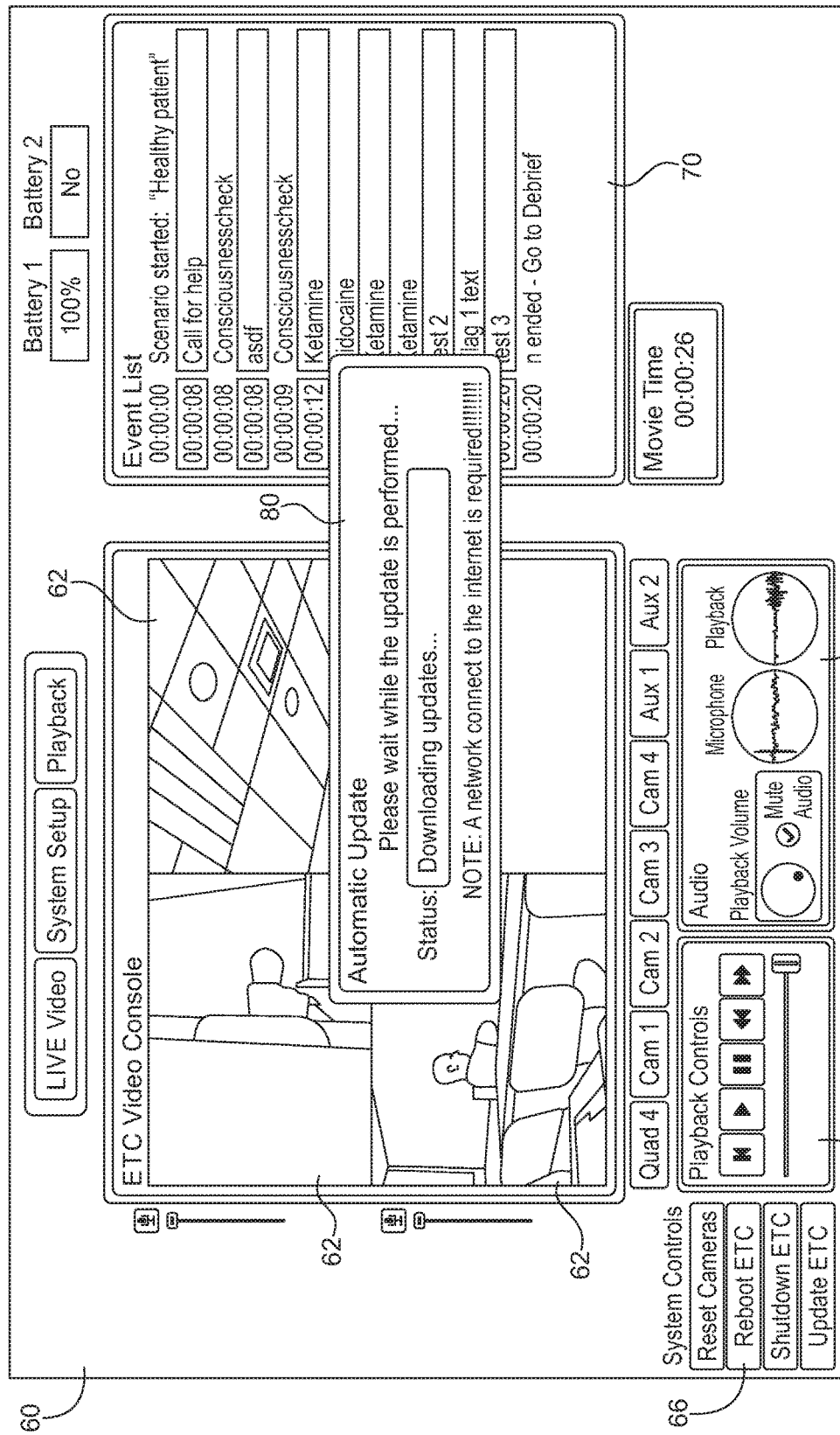
FIG. 9 is a representative screenshot illustrating an automated updating feature for the apparatus for the integrated recording and playback of video, audio and data inputs according to the present invention.
Figure 10:
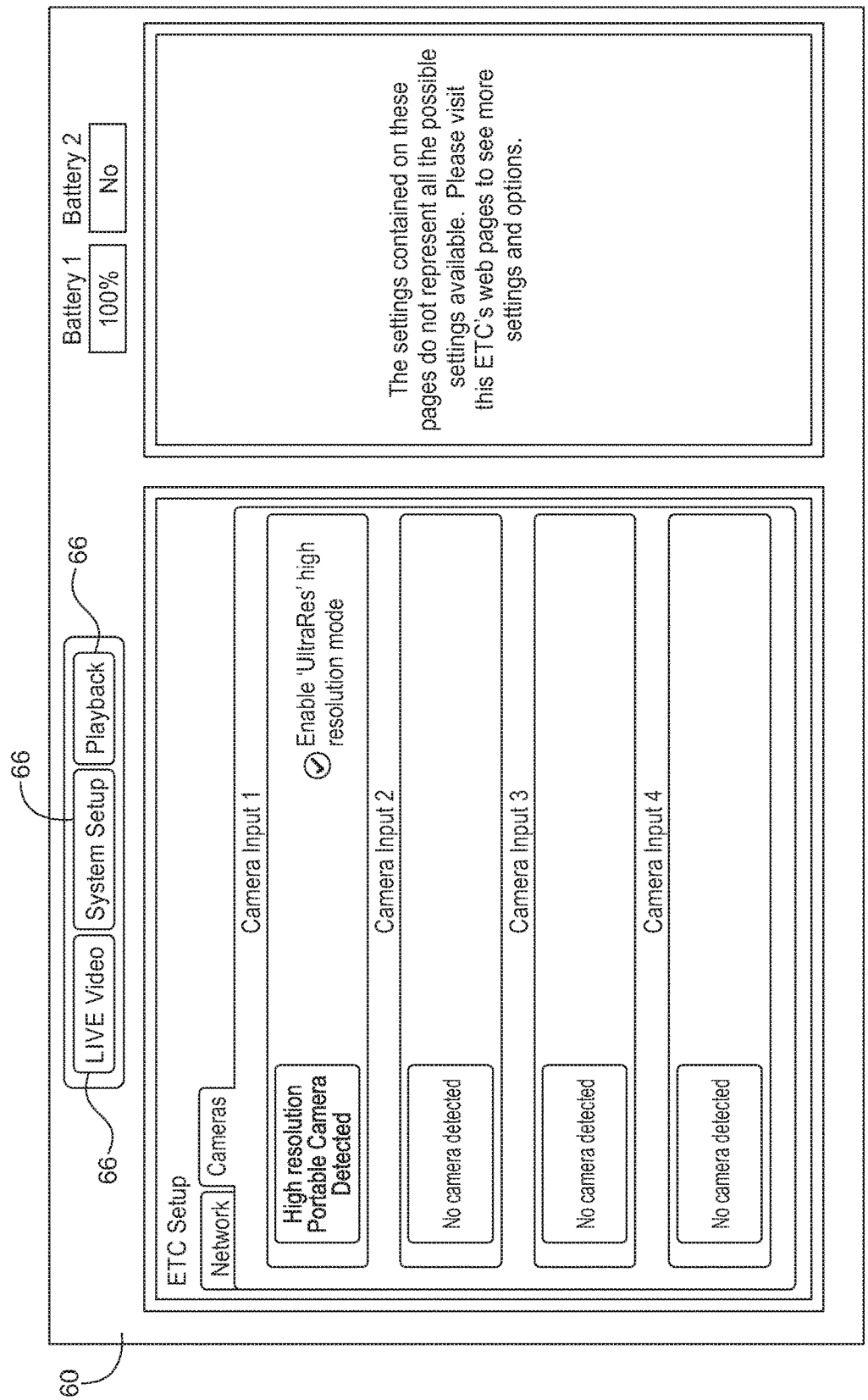
FIG. 10 is a representative screenshot illustrating wireless camera acquisition for the apparatus for the integrated recording and playback of video, audio and data inputs according to the present invention.
Figure 11:
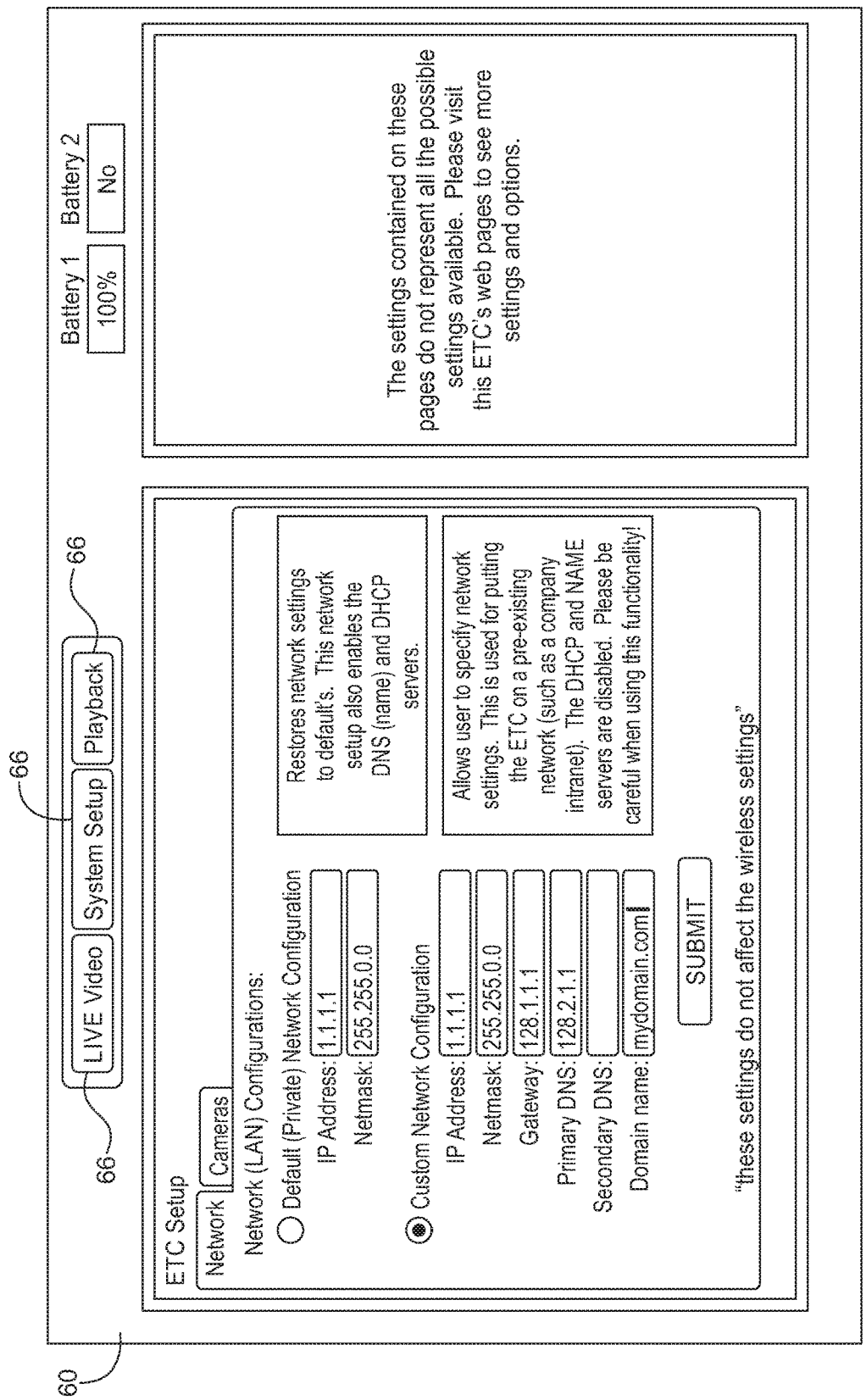
FIG. 11 is a representative screenshot illustrating the network configuration for the apparatus for the integrated recording and playback of video, audio and data inputs according to the present invention.

FIG. 6 is a representative screenshot 60 illustrating one set of video inputs 62 and a set of data inputs 64 from the simulator 12 with on screen controls 66 for the apparatus 10. FIG. 7 is a representative screenshot 60 illustrating one set of video inputs 62 and a data display of the log file flags or event log display 70. This screenshot illustrates a camera 20 control 66 and a session library display 72. The session library allows the users to select a given recorded session or event for playback and editing, and illustrates which session is currently being played back. FIG. 8 is another representative screenshot 60 illustrating one set of video inputs 62 and data inputs 64 from a simulator 12 (here an infant simulator) with on screen controls 66, event log display 70 and session library display 70 for the apparatus 10 for the integrated recording and playback of video, audio and data inputs using patient simulators 12 according to the present invention. FIG. 9 is a representative screenshot 60 illustrating an automated updating feature identified by over laid window box 80 for the apparatus 10, and it illustrates an audio display control 66 that has been beneficial to users. The automatic updating requires a network connection and when selected will download updates to the system via a web connection. FIG. 10 is a representative screenshot 60 illustrating wireless camera acquisition for the apparatus 10 as described above and FIG. 11 is a representative screenshot 60 illustrating the network configuration for the apparatus 10 as described above.

The present invention provides an interactive, integrated log file of an event using a simulator. The integrated log file provides effective backup log file for the event. The integrated log file allows for significant screen control in the selective playback of the session. The integrated log file allows for downloading of the session in standard formatting for playback on other devices. The system allows for automatic user identification and incorporation of participant identification into the integrated log file.

The present invention is disclosed for patient simulators, but is not limited thereto. The present invention has applications in all training simulations where integrated simulation data and relevant recording would be helpful, such as flight simulators. However, it is particularly useful in "team training" simulators such as patient simulators where team interaction is critical. It is also useful where transparent moderator commenting or flagging is desired.

Some applications of the system 10 include employee training where the moderator desires to play out an entire scenario while contemporaneously adding flags through unit 40 without disrupting the session. In such scenarios the data inputs can further include inputs from the trainee, such as data entered by the trainee on a computer 18. For example the session may be training a bank employee on client interactions for opening an account, or dealing with a threatening customer, and the session log incorporates the inputs by the trainee in a contemporaneous time stamped fashion that will appear in the log.

In addition to training the system 10 can be an interviewing aid where no interruptions are desired and information is being solicited from the subject. For example a biographer can engage the subject in a long discussion and quickly flag relevant portions without disrupting the session. The interview aspects may have applications for criminal interrogations as well, wherein a single interviewer can now accomplish what it had previously taken two moderators (one a remote viewer adding comments) to do.

Regarding the interview applications, the system 10 can be easily incorporated with a polygraph system, where the polygraph outputs are additional data inputs for the system. The integration of the in-synch audio and video and data of a polygraph session can greatly facilitate polygraph session reviews. Further the ability of the moderators 24' to contemporaneously flag events in a quick fashion, such as with unit 40, without disrupting the session, and in an inconspicuous manner can aid the results.

Regarding the interview applications, the system 10 can be also easily incorporated with a stenographic deposition system, where the stenographers outputs are data inputs for the system. For this application the system can add a time offset (1-3 seconds) for the stenographic inputs (generally a delay in the other inputs) whereby the inputs appear more contemporaneous with the speech. The integration of the in-synch audio and video and data of a deposition session together with the ability of one or more moderators or attorneys to contemporaneously and transparently flag sections of the deposition can greatly facilitate deposition session reviews. In this application it is anticipated that separate log files without one party's flags may be created by the controller 14 so that one party's flags need not be presented to the other side, and a "clean" copy of the session with BOTH parties confidential flags removed be prepared to form an "official" deposition record.

The present invention as described above provides for a method of conducting a session comprising at least one subject 24 and at least one moderator 24' comprising the steps of capturing at least one video image of the subject during at least part of the session from at least one video camera 20; capturing at least one audio record of at least a portion of the session from at least one microphone (integral to cameras 20 or separate 22); integrating each video image and each audio record into a common log file; and contemporaneously flagging the common log file by at least one moderator 24' during the session through a wireless controller 40, wherein each flag is a time sequenced moderator input into the common log file as shown in display 70.

The present invention as described provides that the flagging controller 40 is a handheld device with a plurality of independent input buttons 42 that each provide for independent flags to be entered into the log file and wherein the flagging controller 40 includes independent functionality 44, such as a laser pointer and an audio recorder.

The present invention as described provides for capturing data source inputs throughout at least a portion of the session which correspond to at least one simulated parameter of a training simulator 12, such as a patient simulator, and wherein the data source inputs of the training simulator are integrated into the common log file.

The present invention as described above provides for a plurality of video cameras 20 being wirelessly coupled to the common log file, and wherein the common log is on a central controller 14 and further comprising the step of automatically synching the each wireless video camera 20 to the central controller 14 when the wireless video camera is within range of the central controller 14.

The present invention as described above provides that the common log may be on a central controller 14 that has an independent display, and wherein common log file allows independent, simultaneous, synchronized, user controlled playback of the individual inputs received within the common log file.

The present invention as described above provides that the session may include a polygraph of the subject and further includes the step of capturing data source inputs throughout at least a portion of the session which correspond to at least one parameter of the polygraph, and wherein the data source inputs of the polygraph are integrated into the common log file.

The present invention as described above provides that the session may be a deposition of the subject and further includes a stenographer and the step of capturing data source inputs throughout at least a portion of the session which correspond to stenographic output of the stenographer, and wherein the data source inputs of the stenographer are integrated into the common log file.

The present invention as described above provides that the session may include at least two moderators each having an independent flagging controller, and wherein the common log file is configured to differentiate the flagging controllers.

The present invention as described above provides for editing of the log file after the session. The present invention as described above provides use of an Identification Card to input the identity of at least one subject or moderator into to common log file.

The present invention as described above describes a method of conducting a session comprising at least one subject and at least one moderator comprising the steps of: capturing at least one video image of the subject during at least part of the session from at least one video camera 20; wirelessly transmitting at least one video image to a central controller 14; capturing at least one audio record of at least a portion of the session from at least one microphone (independent microphone 22 or integral with camera 20); wirelessly transmitting at least one audio record to a central controller; capturing data source inputs throughout at least a portion of the session which correspond to at least one simulated parameter of a training simulator 12; wirelessly transmitting at least one audio record to a central controller; and integrating each video image and each audio record and each data source input into a common log file.

There are many particular applications for the system 10. The wide variety of modifications and applications of the present invention will be apparent to those of ordinary skill in the art and these are included within the breadth and scope of the present invention. The scope of the present invention is defined by the appended claims and equivalents thereto.

What is claimed is:

1. A method of conducting a session with a training simulator comprising at least one subject and at least one moderator comprising the steps of:
    Capturing at least one video image of the subject during at least part of the session with the training simulator from at least one video camera, the training simulator simulates physiological parameters including at least one of heart rate, breath rate, blood pressure, blood oxygenation, body temperature, pupil dilation and extremity changes;
    Capturing at least one audio record of at least a portion of the session with the training simulator from at least one microphone;
    Capturing data source inputs throughout at least a portion of the session which correspond to at least one simulated parameter of the training simulator;
Integrating each of the data source inputs of the training simulator, each video image and each audio record into a common log file; and
    Contemporaneously flagging the common log file by at least one moderator during the session through a wireless controller, wherein each flag is a time sequenced moderator input into the common log file,
wherein the common log file allows independent, simultaneous, synchronized, user controlled playback of the individual inputs received within the common log file.

2. The method of conducting a session with a training simulator comprising at least one subject and at least one moderator according to claim 1 wherein flagging controller is a handheld device with a plurality of independent input buttons that each provide for independent flags to be entered into the log file.

3. The method of conducting a session with a training simulator comprising at least one subject and at least one moderator according to claim 2 wherein the flagging controller includes independent functionality.

4. The method of conducting a session with a training simulator comprising at least one subject and at least one moderator according to claim 3 wherein the independent functionality of the flagging controller includes one of a laser pointer and an audio recorder.

5. The method of conducting a session with a training simulator comprising at least one subject and at least one moderator according to claim 1 wherein the training simulator is a patient simulator.

6. The method of conducting a session with a training simulator comprising at least one subject and at least one moderator according to claim 1 wherein a plurality of video cameras are provided with at least one video camera being wirelessly coupled to the common log file.

7. The method of conducting a session with a training simulator comprising at least one subject and at least one moderator according to claim 6 wherein the common log is on a central controller and further comprising the step of automatically synching the each wireless video camera to the central controller when the wireless video camera is within range of the central controller.

8. The method of conducting a session with a training simulator comprising at least one subject and at least one moderator according to claim 6 wherein the common log is on a central controller that has an independent display.

9. The method of conducting a session with a training simulator comprising at least one subject and at least one moderator according to claim 1 wherein the session includes a polygraph of the subject and further includes the step of capturing data source inputs throughout at least a portion of the session which correspond to at least one parameter of the polygraph, and wherein the data source inputs of the polygraph are integrated into the common log file.

10. The method of conducting a session with a training simulator comprising at least one subject and at least one moderator according to claim 1 wherein the session is a deposition of the subject and further includes a stenographer and the step of capturing data source inputs throughout at least a portion of the session which correspond to stenographic output of the stenographer, and wherein the data source inputs of the stenographer are integrated into the common log file.

11. A method of conducting a session with a training simulator comprising at least one subject and at least one moderator comprising the steps of:
Capturing at least one video image of the subject during at least part of the session with the training simulator from at least one video camera, the training simulator simulates physiological parameters including at least one of heart rate, breath rate, blood pressure, blood oxygenation, body temperature, pupil dilation and extremity changes;
Capturing at least one audio record of at least a portion of the session with the training simulator from at least one microphone;
Capturing data source inputs throughout at least a portion of the session which correspond to at least one simulated parameter of the training simulator;
Integrating each of the data source inputs of the training simulator, each video image and each audio record into a common log file; and
Contemporaneously flagging the common log file by at least one moderator during the session through a wireless controller, wherein each flag is a time sequenced moderator input into the common log file,
wherein the session includes at least two moderators each having an independent flagging controller, and wherein the common log file is configured to differentiate the flagging controllers.

12. The method of conducting a session with a training simulator comprising at least one subject and at least one moderator according to claim 1 further comprising the step of editing the log file after the session.

13. The method of conducting a session with a training simulator comprising at least one subject and at least one moderator according to claim 1 further comprising the step of using an Identification Card to input the identity of at least one subject or moderator into to common log file.

14. A method for the integrated recording and playback of video, audio and data inputs using training simulators, the training simulators simulate physiological parameters including at least one of heart rate, breath rate, blood pressure, blood oxygenation, body temperature, pupil dilation and extremity changes, the method comprising the step of simultaneously receiving at least one data source input, at least one audio input and at least one video inputs into a common digital memory buffer in a time stamped manner for at least a given training event, wherein at least one of the data source inputs is a data record throughout the event of at least one simulated parameter of the training simulator, wherein at least one audio input is an audio record of the training event and at least one video input is a video record of the training event, and wherein the common memory buffer allows independent, simultaneous, synchronized, user controlled playback of the individual inputs received within the memory buffer.

15. The method of claim 14 wherein the simulator is a patient simulator and further including the step of contemporaneously flagging the common memory buffer during the event through a wireless controller, wherein each flag is a time sequenced moderator input into the common memory buffer.

16. The method of claim 14 wherein at least one data source input, at least one audio input and at least one video input are wirelessly coupled to the common memory buffer.

* * * * *